(No Model.) 9 Sheets—Sheet 2.
R. R. SNOWDEN & A. C. IVES.
AUTOMATIC ELECTRIC SAFETY SYSTEM FOR RAILROADS.
No. 533,398. Patented Jan. 29, 1895.
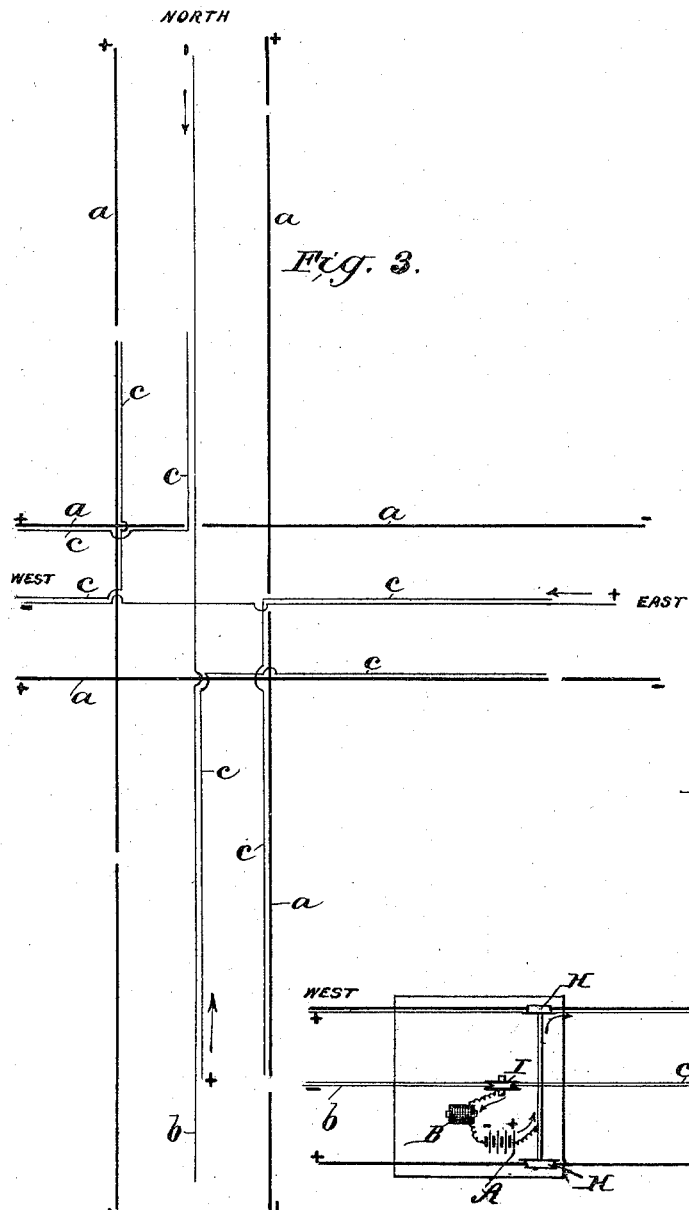
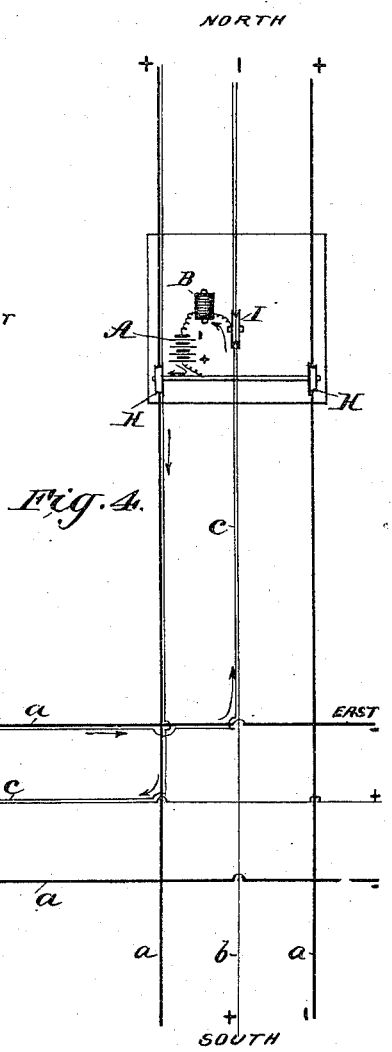
Fig. 3.
Fig. 4.
WITNESSES:
Fred G. Dieterich
Edw. U. Byrn
INVENTORS
Rene R. Snowden
Albert C. Ives.
BY Munn & Co
ATTORNEYS.

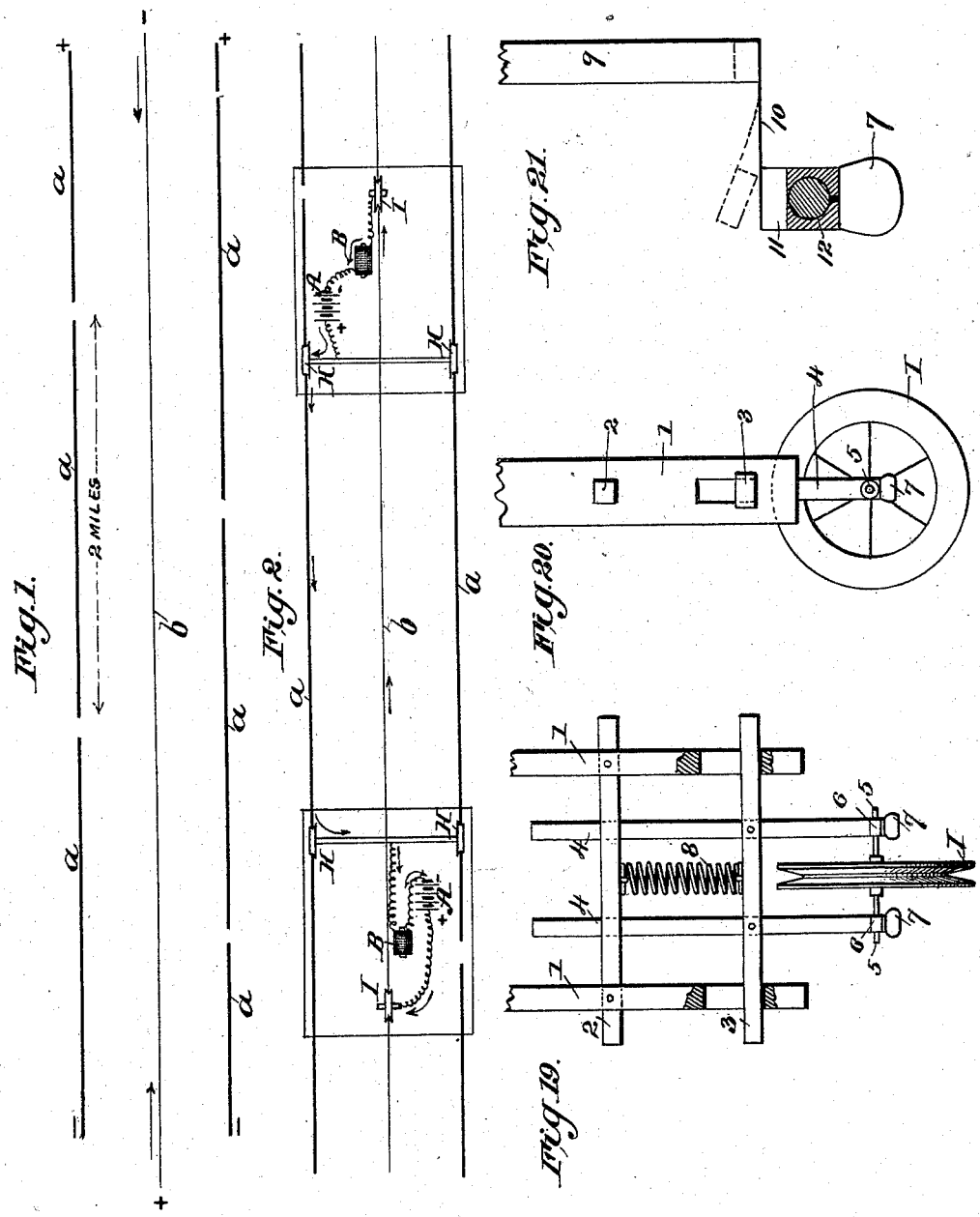

(No Model.) 9 Sheets—Sheet 3.
R. R. SNOWDEN & A. C. IVES.
AUTOMATIC ELECTRIC SAFETY SYSTEM FOR RAILROADS.
No. 533,398. Patented Jan. 29, 1895.
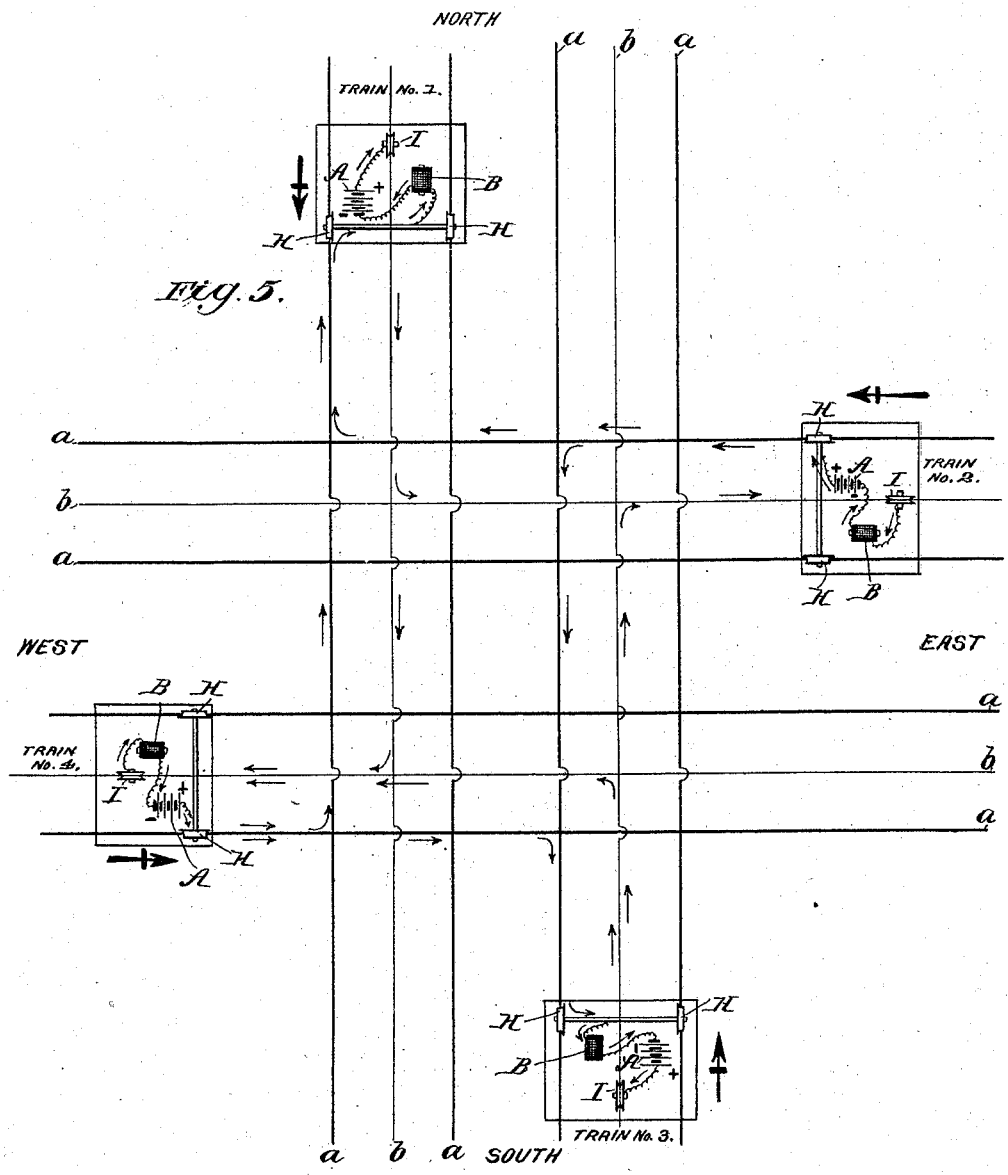

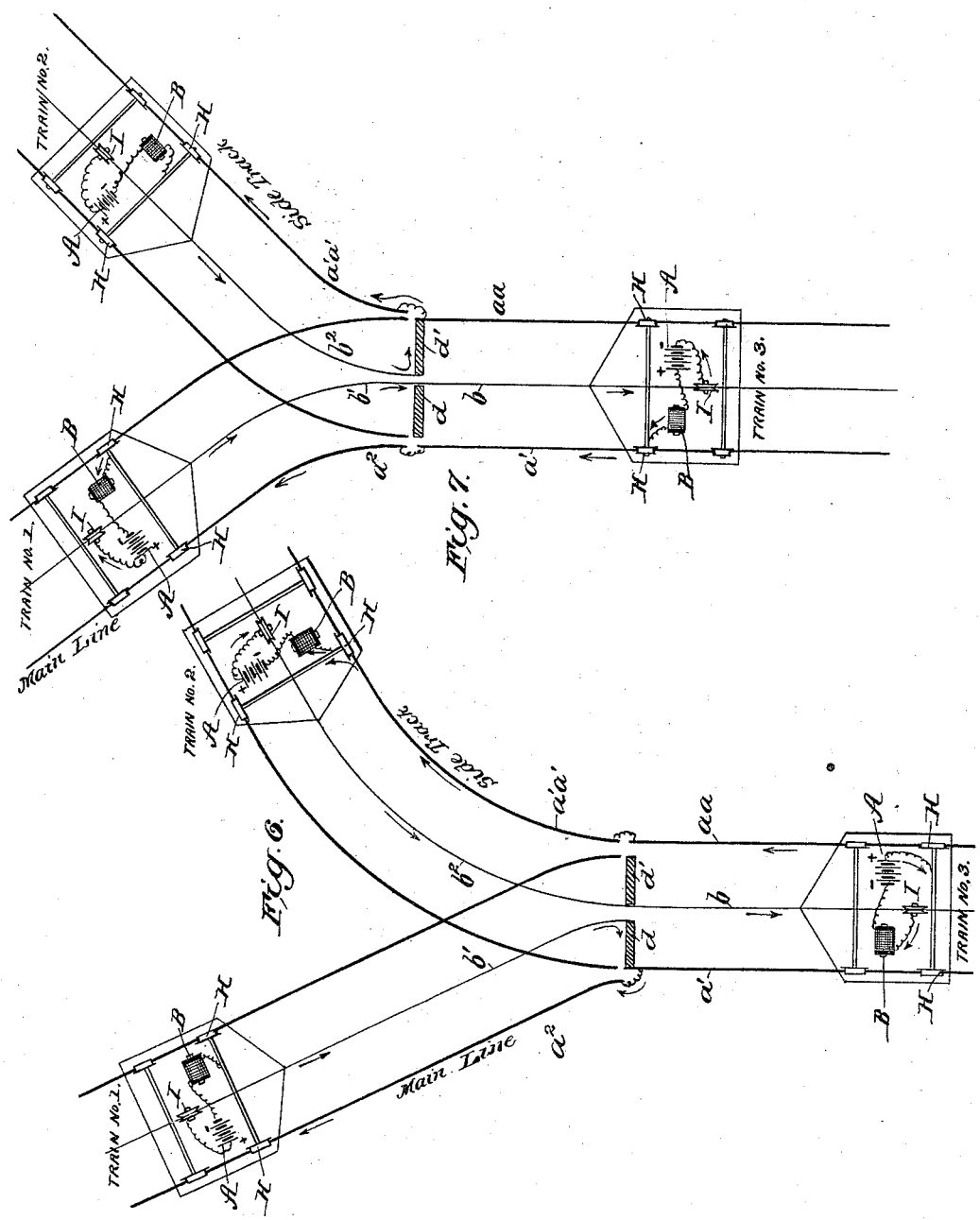

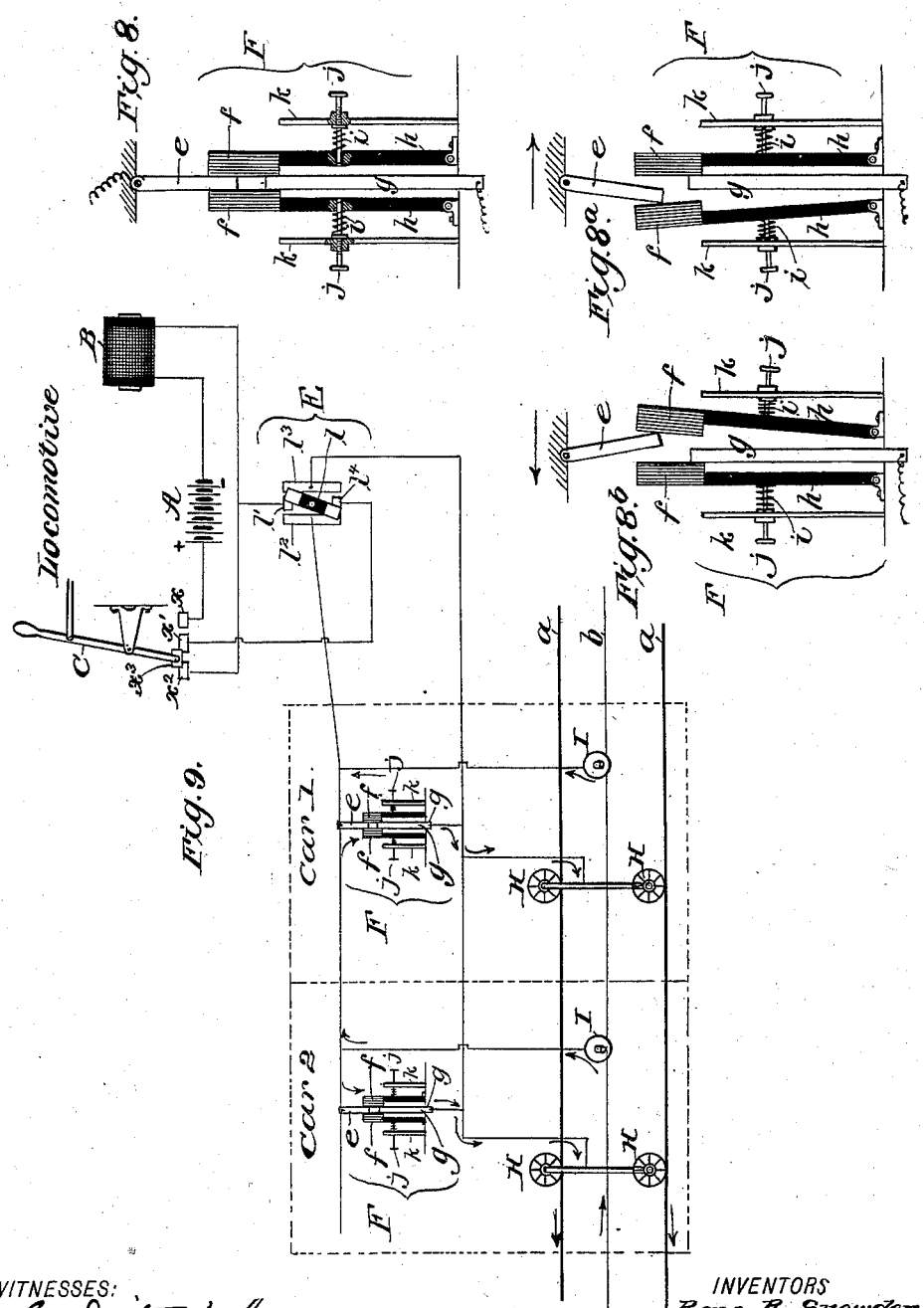

(No Model.) 9 Sheets—Sheet 6.
R. R. SNOWDEN & A. C. IVES.
AUTOMATIC ELECTRIC SAFETY SYSTEM FOR RAILROADS.
No. 533,398. Patented Jan. 29, 1895.
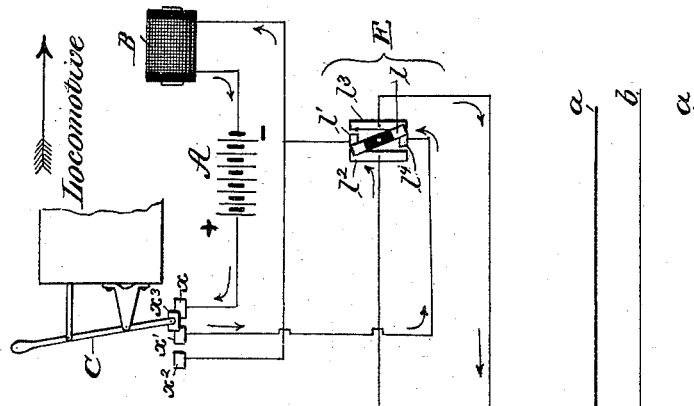
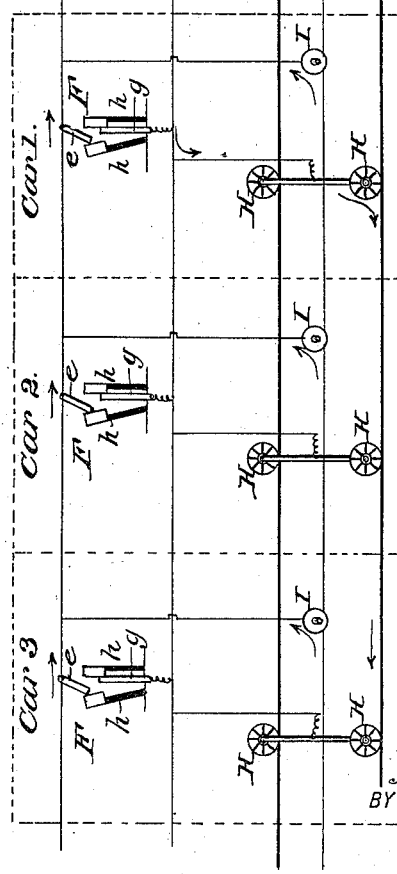
Fig. 10.
WITNESSES:
Fred G. Dieterich
Edw. H. Byrn
INVENTORS
Rene R. Snowden
Albert C. Ives
BY
Munn & Co.
ATTORNEYS.

(No Model.) 9 Sheets—Sheet 7.
R. R. SNOWDEN & A. C. IVES.
AUTOMATIC ELECTRIC SAFETY SYSTEM FOR RAILROADS.
No. 533,398. Patented Jan. 29, 1895.
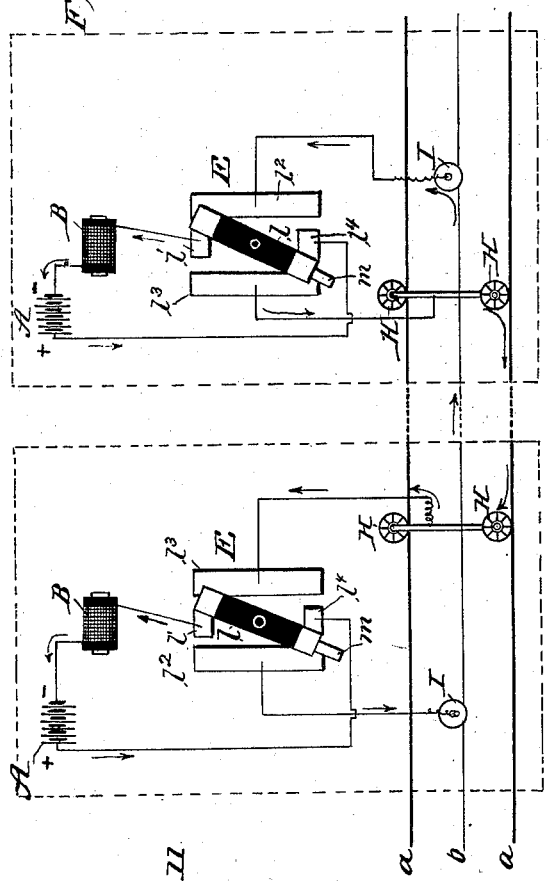
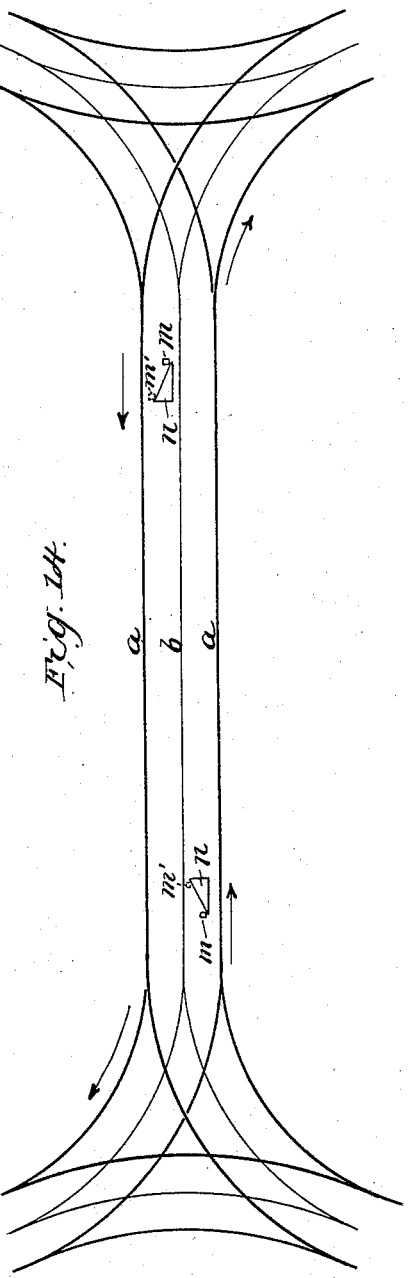

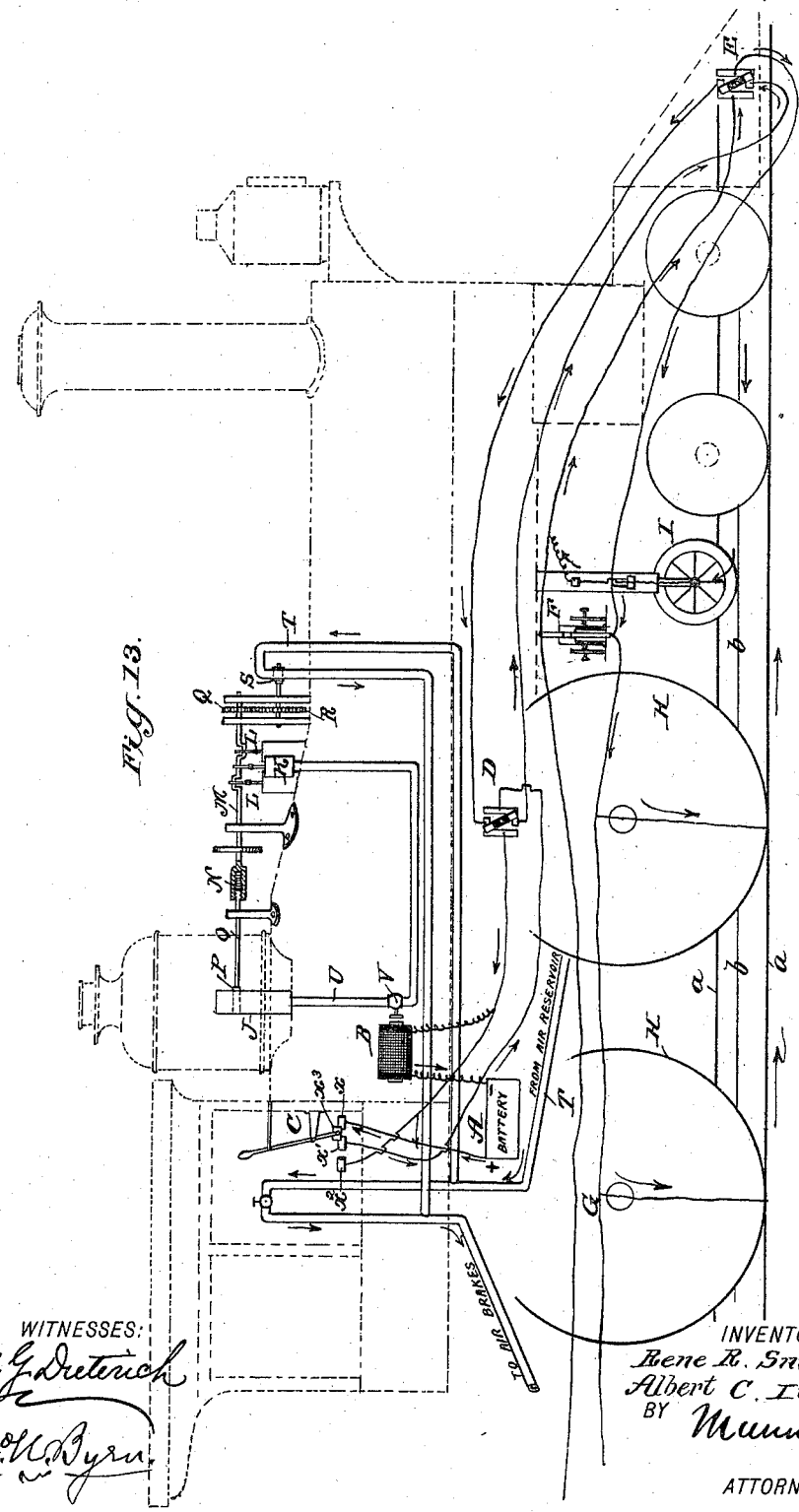

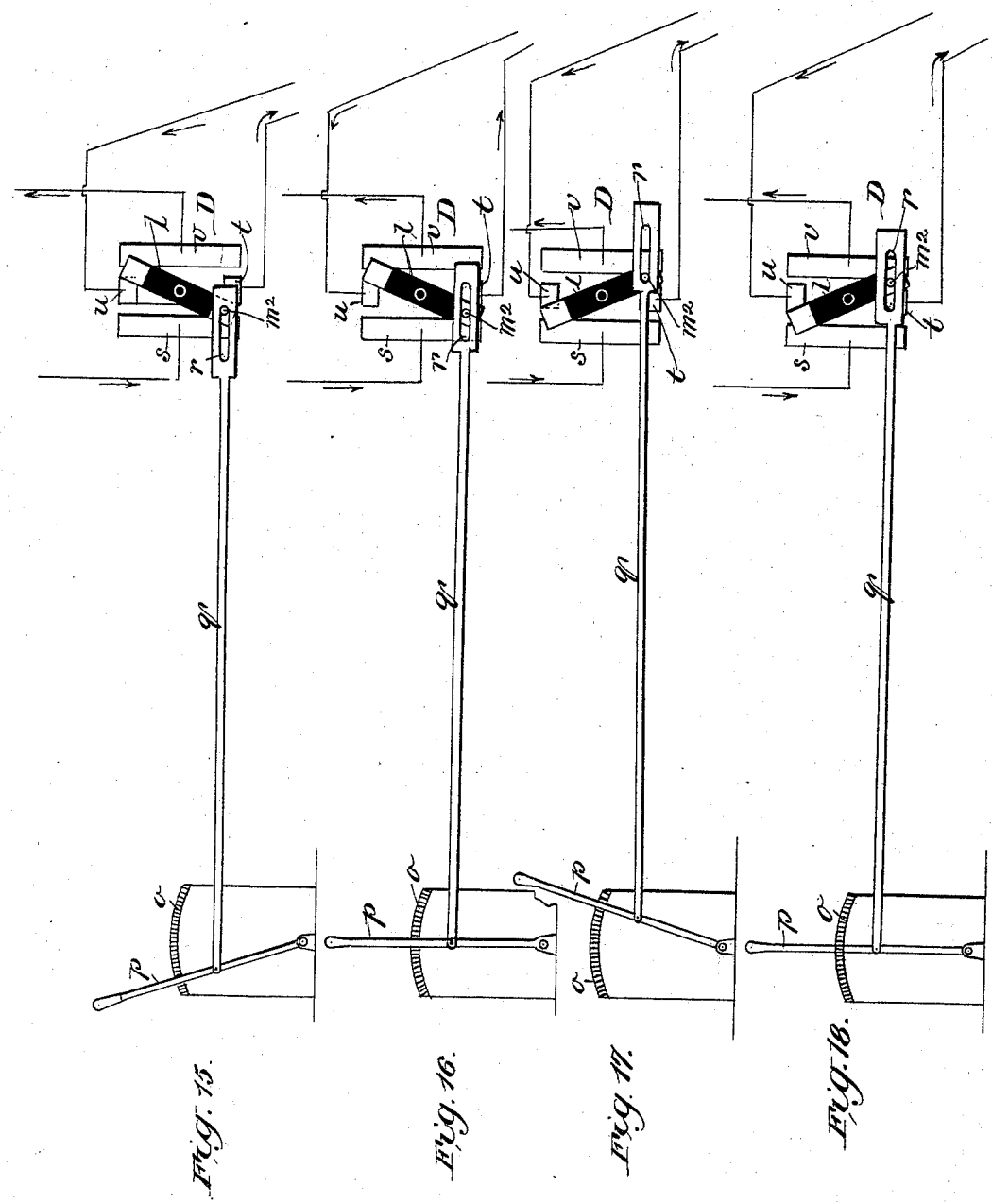

UNITED STATES PATENT OFFICE.

RENE RAVENEL SNOWDEN AND ALBERT CRONIN IVES, OF OCALA, FLORIDA.

AUTOMATIC ELECTRIC SAFETY SYSTEM FOR RAILROADS.

SPECIFICATION forming part of Letters Patent No. 533,398, dated January 29, 1895.

Application filed January 26, 1894. Serial No. 498,124. (No model.)

*To all whom it may concern:*

Be it known that we, RENE RAVENEL SNOWDEN and ALBERT CRONIN IVES, of Ocala, in the county of Marion and State of Florida, have invented a new and useful Improvement in Automatic Electric Safety Systems for Railroads, of which the following is a specification.

Figure 1 is a plan view of a line of railroad, covering several sections in accordance with our invention. Fig. 2 is a diagrammatic view of two locomotives running toward each other on one of the sections of track, the direction of the circuits being indicated by the arrows. Fig. 3 is a plan view of a single track rail road crossing, arranged in accordance with our invention. Fig. 4 is a diagrammatic view of two locomotives running toward the crossing at the same time, the direction of the circuits being indicated by the arrows. Fig. 5 is a diagrammatic view of a double track crossing, showing by the arrows the flow of the currents from the four different locomotives. Fig. 6 is a diagrammatic plan view of a main line, side track, and switch, showing the circuits for the three positions of the locomotives, the switch being closed to the side track and the main line open. Fig. 7 is a similar view showing the main line closed and the side track open. Fig. 8 is an enlarged detail of an automatic short circuiting device arranged under the cars, this figure showing the position of the parts when the train is standing still. Fig. 8ᵃ is a similar view showing the short circuit automatically opened by the advance of the train. Fig. 8ᵇ is still another view of the same parts showing the short circuit opened by the backing of the train. Fig. 9 is a diagrammatic view of the track, the devices on the cars, and the devices on the locomotives, and the circuits when a train is standing still. Fig. 10 is a similar view showing the position of the parts and the circuits when the train is moving forward. Figs. 11 and 12 are diagrammatic views of the track and the position of the two double pole reversing switches on the two trains approaching each other, and the direction of the currents flowing between the two trains. Fig. 13 is a side view of the devices carried by the locomotive, showing the latter in dotted lines, and the relation of the mechanical features of our invention to the same. Fig. 14 is a plan view on a small scale of an entire railroad line, with the Y's at the end for turning the locomotive around, and with devices in the road bed for automatically reversing the electric switches of the locomotive. Figs. 15, 16, 17, and 18 are different views of the reversing lever of the locomotive shown in its co-operation with the double pole switch of the system. Figs. 19 and 20 are side and edge views of the trolley wheel and its support carried by the cars, and Fig. 21 is a device for making electric contact with the axle of the car wheels.

The object of this invention is, first, the prevention of collisions of rail road trains or locomotives either in front or from the rear; second, to prevent running into an open switch; third, to prevent more than one train occupying a crossing at a time, and, fourth, the protection of a car left upon the track accidentally or otherwise against oncoming trains from either direction.

It relates to automatic rail road signaling and controlling devices; in which each train is provided with a suitable battery, and is made to communicate through the track, as a conductor, with the other train, which track is laid in insulated sections; and it consists in the peculiar construction and arrangement of the conductors, trolleys, circuits, switches, and their connection with and interdependence upon the operating parts of the locomotive, as will be hereinafter fully described whereby the movement of one train is made to influence the other and also itself through its steam and air valves.

That the invention may be better understood, we will first give only a general description of the operation, and afterward a more detailed explanation of the novel features.

Every locomotive is provided with a battery and the means of projecting an electrical current over any continuous circuit from its battery. The closed circuit is only made when two trains approach within a predetermined distance of each other on the same track, or when a train approaches an open switch, or a car is standing or running slowly, on the same track with another train. As soon as the circuit is closed, an electrical current passes through each locomotive which is provided with mechanical means for automatically closing the steam valve supplying the motive power and putting on the air brakes thereby stopping both trains.

Referring to the drawings, the track (see Fig. 1) is composed of three rails in all, as follows: the two main rails $a$ and a trolley rail $b$ along the center of the track. The main rails $a$ are laid in insulated sections of suitable length, say two miles, the sections of one rail being alternated with those of the other rail, so as to break joints as shown. The main rail $a$ must be electrically continuous only throughout the section while the trolley rail $b$ must be unbroken throughout its entire length. In Fig. 1 the arrow shows the directions of two trains, and it will be seen that all the trains going in one direction on the track (say from right to left) must have one and the same connection with the track (for instance positive with the main rail and negative with the trolley rail), while all those going in the other direction (say from left to right) must have the opposite connection with the track (say for instance positive with the trolley rail and negative with the main rails). By positive or negative connection with any particular rail is meant that the positive or negative pole of the battery on said train, as the case may be, is connected with such rail.

Fig. 2 is intended to show two trains approaching each other on the same track. They now occupy the same section of the main rail at one time. As soon as this occurs a current of electricity passes through the electro-magnet on each locomotive, the arrows indicating the course of the current. A is an electric battery, B is an electro-magnet, H is a car wheel on main rail and I is a trolley wheel on the middle rail $b$.

Fig. 3 shows the arrangement of the track at crossings. It will be seen that opposite connections must always be presented to have the electrical current pass through the circuit in which there are two batteries and two electro-magnets. This being so we secure such opposite connections with two sides of the crossing for every train approaching said crossing by simply connecting electrically the main rails of the one road with the main rails of the crossing road, and the trolley rail of the one with the trolley rail of the other; but there is still one side of the crossing that will present like connections, namely, positive with positive and negative with negative. For instance, a train coming from north has positive connection with the main rail and negative with the trolley rail. This will be sensitive to trains coming from east as well as those coming from south because they have opposite connections with the track, namely, negative with main rail and positive with the trolley rail; but the train from north will not be sensitive to one from west because they have the same connection with the track, viz: positive with main rail and negative with trolley rail. This difficulty is overcome by placing alongside and insulated from the main rail on one side the crossing, another right angular or bent rail $c$ which is trod upon or touched by the flange of the car wheel. This extra rail $c$ runs beside main rails $a$ and then turns and runs alongside the trolley rail of the other line. This gives the negative connection of one side with the positive of the other side of the crossing. To render this practicable it is necessary that the extra rails $c\,c$ should be insulated from the main rails $a$ and trolley rail $b$, and also from each other, so that when the wheels of the car pass on to the rails $c\,c$ these rails $c\,c$ will carry the current between the trains on the north and west sections of the road, and also between trains on the east and south sections of the road. Wherever one rail crosses another with a little curve or arch in the drawings, it is intended to represent that the two rails do not make electrical contact at that point.

Fig. 4 is intended to show the passage of the electrical current over this extra rail $c$, making a train on one side of a crossing sensitive to a train on that other side of the crossing where it would not be sensitive to it without the operation of the extra rails $c$. A is the battery; B, the electro-magnet; H, the main track wheel; I, the trolley wheel, and $c$ the extra rail pressed by the car wheel flange. In this figure we show the course of the electric current in case of two trains approaching a crossing at the same time, on lines where the single track system is used. In case of a double track the extra rail $c$ is not necessary, (see Fig. 5) but all trains on one line must have one connection with the track (say positive with main rails), and all trains on the crossing line must have the opposite connection with the track (say positive with the trolley rail).

In Fig. 5 the small arrows indicate the direction of the electric currents while the large crossed arrows indicate the direction of the trains. To illustrate the action we will say a train from the east and one from the north are approaching the crossing at the same time and they have simultaneously entered the section containing the crossing. The circuit being completed by the two trains (or two locomotives) being on the same section, a current passes from the battery A of the eastern train (No. 2) through the axle and wheels H to the main rails $a$ thence to the main rails $a$ of the northern train (No. 1) through the wheels H and axle, through the magnet B to the negative side of battery A thus operating the mechanism on the northern train (No. 1) then through the battery A on train No. 1, through the trolley wheel I and rail $b$ to its union with the trolley rail $b$ of the east and west road, to the trolley wheel I of train No. 2, through the magnet B of train No. 2, operating its mechanism, and back to the negative side of battery A of train No. 2. It will be remembered that both batteries are active whenever the circuit is closed. By tracing the circuits indicated by the arrows it will be seen that each train is sensitive to trains on both tracks of the crossing road.

Fig. 6 represents the connections at a rail road switch. $d$ $d'$ represent stationary electrical conductors. The movable rail $a'$ is always electrically connected with the rail $a^2$ but never with the corresponding switch rail. The movable rail $a$ $a$ is always in electrical contact with the switch rail $a'$ $a'$ but never with the corresponding main rail. The trolley switch rail $b$ is adjustable to either of the trolley rails $b'$ $b^2$ and always electrically continuous with the trolley rail of the side ready for a train to run into. To illustrate the course of the current in Fig. 6 which shows the main line open and side track closed, a train No. 1 is running toward danger in the form of a break in the main line. The moment it enters the section containing the switch an electrical current passes from the battery A through the trolley wheel I and trolley rail to the conductor $d$ through the connection with and along the main rail $a^2$ to wheels H and axle through electro-magnet B back to battery A stopping the train in danger of running off of the track. Trains Nos. 2 and 3 it will be seen have the same relation to each other as if they were on an ordinary section of track as the connections through the switch make the tracks they occupy continuous with each other.

In Fig. 7 the main line is closed and the side track open and trains Nos. 1 and 3 occupy the same relation as if they were on a straight piece of track while train No. 2 is operated precisely as train No. 1 in Fig. 6. On double track roads as the trains on one track all run in the same direction it is manifest that as long as two trains next to each other maintain an equal rate of speed there can be no collision between them. The danger does not exist until the forward train lessens its speed or stops.

We have shown an arrangement in Fig. 8 that provides an automatic short circuit as soon as the speed is reduced to a certain predetermined rate, (say for instance to ten miles per hour.) It consists of a metallic plate $e$ hanging loosely under, and crosswise to the length of the car, and just below, and not quite touching the plate $e$ another but stationary metallic plate $g$. A metallic bridge plate $f$ is arranged on each side of and overlapping the two plates $e$ and $g$, and are supported each by non-conducting arms $h$ hinged at the bottom so as to fall away from the two plates $e$ and $g$ were it not for the spiral springs $i$ held in position by pin $j$ sliding through a hole in the arm $h$.

A branch of the wire from the trolley wheel I is connected, see Figs. 9 and 10, with one of the plates $e$ and a branch of the wire from the main wheels H is connected with the other plate $g$. Now when the car is standing still, or running at less than the predetermined speed, the pendent plate hangs perpendicularly over the rigid plate, both being clasped by the conductors $f$ and $f$ as in Fig. 8. This closes the short circuit so that a current from any other train carrying no matter what connections, instead of going through the battery and magnet, will go through this short circuit, passing in every case through its own magnet, however and operating as hereinafter described. The pin $j$ screws into the post $k$ and has a stationary nut on it between the spring $i$ and the post $k$. By turning the pin $j$ the spring $i$ may be made stronger by compression against the arm $h$. By this means the sensitiveness of the plate $e$ is adjustable so that it will disconnect the contact between the plates $e$ and $g$ at a greater or less speed of the train as desired. The inertia of the atmosphere acts upon the pendent plate $e$ deflecting it backward or forward as in Figs. $8^a$ and $8^b$ according to the direction of the motion of the train.

Whenever the engineer by the adjustment of his throttle valve lever shuts off steam entirely, or sufficiently to reduce the speed of the train to produce the short circuit under the cars, he at the same time and by the same movement establishes an independent circuit, cutting out his own battery and magnet from the circuit. To illustrate this we now refer to Figs. 9 and 10 showing the electrical system of our invention, and the connections throughout, without regard to either proportion or position of the different parts. Fig. 9 shows the condition and relation of the parts when the throttle valve is closed or nearly so and the train is standing still or running slowly enough for the short circuit to be made under the cars. The plate $x^3$ on the end of the throttle valve lever electrically connects plates $x'$ $x^2$ and the switch E connects contact $l'$ to $l^3$ and $l^2$ to $l^4$. The electrical current coming along the trolley rail $b$ from the battery of the other train passes up through the trolley wheel I through the plates $e f$ and $g$ on to the car wheels H on main track $a$, then back to the magnet B and battery A of the train it originated in without passing through switch E, magnet B and battery A of this Fig. 9.

Fig. 10 shows the throttle valve lever open and the condition and relation of the parts when the train is running fast enough to open the short circuit. The current leaving the positive (+) pole of the battery A passes through the conductors $x$ $x^3$ $x'$ at the lower end of the throttle valve lever, then through contacts $l^4$ $l^3$ of the reversing switch E through the car wheels H along main track $a$ to the magnet and negative (−) pole of the battery on the other train, through a similar arrangement of switch, &c., on the other train, down to the trolley track $b$ and wheel I through the opposite connections $l^2$ $l'$ of reversing switch E, then through the magnet B to the negative (—) pole of the battery A. In this figure the multiplied connections *e g* shown at 1—2—3, &c., do not involve any other change in the circuits except to merely multiply the contacts under each car to insure connection between the cars and rails.

Figs. 11 and 12 show the two positions of the two reversing switches E on the two trains and their connections. Fig. 11 shows the current passing to the trolley rail *b* to the train represented by Fig. 12 then back through the main rails *a* and up to the magnet B and battery A of train Fig. 11 again, while Fig. 12 shows the switch connections reversed, *i. e.*, the current passing to the main rails *a* to the train Fig. 11 and back through the trolley rail *b* and back to the magnet B and battery A.

Fig. 13 illustrates the working of the circuits in connection with the mechanical features of the locomotive so far as concerns one of the trains occupying the section at the same time, the mechanism on the other train being a duplicate of the one here illustrated. In this Fig. 13 we have two reversing switches one shown at D and the other at E. The former is arranged to be operated by the engineer through the lever by which he reverses his engine, and the latter E, is designed to be automatically reversed by mechanism in the road bed at the ends of the route, the mechanism for which will be described hereinafter. A is the battery; B, the electro-magnet, and C the throttle valve lever. V is a sensitive valve arranged in steam pipe U and adapted to be opened by the electro-magnet to admit steam to the small supplemental engine K L L. When this valve is opened it actuates the supplemental engine and shuts the main steam valve P cutting off steam from the locomotive cylinder, and opens an air valve S which permits compressed air to pass to the brake cylinder from the air reservoir through the pipe T. We will suppose that this train is running at full speed when suddenly another train approaching from the front enters this section of the track. The electric current at once passes from the positive pole of the battery A through the connections at the end of the throttle valve lever C down to one side of the reversing switch D and out the lower pole of the reversing switch D to the reversing switch E back to the axle of the wheels H on main rails *a* through main rails *a* and the other train, back through trolley rail *b*, trolley wheel I, then to left hand side of reversing switch E and out upper pole of same, through the other side of switch D to the electro-magnet B and the battery. The passage of this electric current causes the magnet B to draw the valve V letting steam from the dry pipe J through the pipe U into the steam chest K actuating the pistons L L turning the shaft M upon which is a sleeve N with screw threads inside corresponding with and acting upon threads on the end of the valve stem O. The turning of this shaft has the effect of pushing in and closing the valve P shutting off the supply of steam from the locomotive cylinders. Near the other end of and on the shaft M is a pinion Q working in a spur wheel R made larger than Q for the purpose of reducing the speed of the shaft M. On the end of the spur wheel shaft is a revolving valve S in pipe T which has a similar action to that of the engineer's air brake valve. This valve turns on the air to the air brake mechanism through the pipe T. Thus the power is cut off from the locomotive and the air brakes applied in a perfectly automatic manner.

Fig. 14 shows our device for automatically reversing the connections of the switch E at the end of the line of the road. This figure shows an entire line of road including the Y at each end. The reversing switch E, shown in Figs. 11 and 12, is situated under the cowcatcher see Fig. 13 and near the track, with a downward projection *m* from one end of the switch lever *l* Figs. 11, 12 or 14, which, as the train or locomotive moves in the direction indicated by the arrow Fig. 14, strikes the beveled block *n* at its narrowest end sliding over to its wide end as indicated by dotted position at *m'* and thus turning the lever *l* of the switch. As this reversing switch is placed to the right of the center of the track while the actuating block is on the right of the track only when coming out of the Y it is seen that the switch is not affected by the block until the train is turned round.

Figs. 15, 16, 17, and 18 show the operation of the reversing switch D of Fig. 13. When any train is running forward it has connections with the track opposite to those of trains coming to meet it, but if for any cause it should become necessary for the train to run backward it would be continually in danger of colliding with a train running in the direction in which it was running or that was following but now meeting it, were it not for this reversing switch D which the engineer simultaneously reverses by the act of reversing his engine. *o* is the ratchet. *p* is the reversing lever. *q* is a rod pushed or pulled by the action of the reversing lever *p*. *r* is a slot in the end of the rod *q*. $m^2$ is a projection from one end of the switch lever. It will be seen that when the engine is reversed (Fig. 15) the contacts *s* and *t* are connected, and so also are those marked *u* and *v*. In practice, when the engine is reversed the lever *p* is brought back to or near the center while running. Fig. 16 will show this to have been done, and the train is running backward. It is seen that the slot *r* is so elongated that after reversing the switch, the bringing back of the lever near or to the center does not affect the switch, but when the lever *p* is pushed forward Fig. 17, far enough to reverse the engine to the forward position the switch is now reversed again, sensitizing the train to all trains in front. Then the central or running position is again assumed see Fig. 18, without changing the position of the switch, the train now running forward.

Fig. 19 shows the trolley wheel I and its attachment to the car. 1 and 1 are beams or pieces of wood projecting downward from the bottom of the car. 2 and 3 are horizontal pieces passing through 1 and 1. The horizontal piece 2 fits tightly in 1 and 1, while the horizontal piece 3 works up and down in a slot in 1 and 1. 4 and 4 are perpendiculars running loosely through horizontal piece 2 but firmly bound to horizontal piece 3. 5 is the axle of the trolley I and it turns at 6, 6 in self oiling bearings. The oil cups 7 and 7 supply the oil through lamp wick or other fibrous feeders. The spiral spring 8 presses the trolley I down on the rail which fits into the deep groove in the surface of the trolley. This up and down motion of the trolley in the frame 1, 1 counteracts the up and down motion of the car on its springs. The sliding of the axle right and left through the bearings at 6 compensates for the side to side motion of the cars on the track.

Fig. 20 is a side view of the trolley and frame. This shows the horizontal piece 3 enlarged on the outsides of the uprights 1 and 1 so that it cannot slide longitudinally through the slot.

Fig. 21 shows the contact with axle of wheels on main rails. 9 is a perpendicular support running down near the axle 12. Into this support 9 is fixed a steel or brass spring 10 to which is attached a steel block 11 resting upon the axle 12. This is oiled like the trolley bearings, by a self feeding oiler by capillary attraction through a fibrous wick from the cup 7 below. The oiling of the contact between block 11 and axle 12 while somewhat detrimental to the contact is nevertheless desirable, for while it does not defeat the passage of the current, it is necessary to prevent the heating and rapid wearing out of the contacts. Only a very little quantity of oil however is allowed to pass to the bearing by capillary action as described. As the hanger bar 9 is attached to the car body, and the axle 12 is a part of the trucks, the spring 10 is used to take up the motion between the same allowed by the car springs, and produced by the jolting of the axle up and down.

Returning to Fig. 10 the engine and several cars are marked off in block and numbered 1 to 3. One electrical connection is made from car to car by connecting with the coupling of the bumper, while the other connection is made by connecting with the coupling of the air brake pipes. It is seen that each one of the short circuiting apparatus F one to each car operates independently of each other, so that when they are closed, as is the case when the train stops, the current may pass by way of any one of them to the other wire and back along the opposite rail to its source.

Although our invention is designed to cause the position or behavior of one train to automatically influence or control the behavior of another, still there are features of our invention which, apart from this result, may be useful in connection with systems which only transmit signals, and we may so employ such features.

We are aware that it is not broadly new in electric railway systems to provide means for automatically cutting off motive power and putting on the air brakes through the medium of electric circuits, and for this feature we therefore only claim our specific organization of devices for accomplishing that result.

Having thus described our invention, what we claim as new, and desire to secure by Letters Patent, is—

1. The combination with the electric circuits, battery A and electro-magnet B; of steam pipe U with valve V operated upon by the electro-magnet, the steam motor K, crank shaft M with screw sleeve N stem O and throttle valve P, and the air valve S and gears Q R connecting the same to the shaft M substantially as and for the purpose described.

2. The combination with the two electric circuits emanating from two trains and flowing together in the same direction; of a battery A and electro-magnet B with automatic devices controlled thereby for operating the air and steam valves, the throttle valve lever C with contact $x^3$ and the three contacts $x\, x'\, x^2$, two of them being arranged merely to close the external circuit through battery A and electro-magnet B and the other two to close the external circuit outside the battery A and electro-magnet B substantially as shown and for the purpose set forth.

3. In a rail road safety system, the combination with the track rails laid in insulated and alternating sections and an intermediate and continuous trolley rail; of a battery and trolley wheel carried by the train, an electro-magnet included within the circuit, automatic mechanism for controlling the throttle valve and air valve through said electro-magnet and the throttle valve lever bearing an electrical contact moving over other contacts in the circuit and arranged to direct the current from another train either through the battery and electro-magnet, or alternately close the distant line circuit without passing through the said battery and magnet as and for the purpose described.

4. In a rail road safety system, the combination with a battery and circuit closing contacts on the train; of a single track crossing having its main rails laid in insulated and alternated sections and having a middle continuous trolley rail, the main rails of one line being connected to the main rails of the other line and the one trolley rail to the other trolley rail, and extra right angular or bent rails c extending along the main rails of one line and the trolley rail of the other line substantially as and for the purpose described.

5. In a rail road safety system having three rails, two being the main rails laid in insulated and alternated sections, and the third a continuous trolley rail, the combination with the main track; of a movable switch $a'$, $a\ a$, and a siding, a battery and electric contacts on the cars, and the transverse conductors $d\ d'$ on the road bed located at the adjustable ends of the switch rails, one of the main rails $a^2$ and switch rail $a'$ being always electrically connected, and the other of the switch rails $a\ a$ being always connected to one of the main rails $a'\ a'$ of the siding and the adjustable trolley switch rail $b$ being arranged to always maintain a closed circuit alternately with the trolley rail $b'$ of main track and trolley rail $b^2$ of the siding according to the position of the switch rails substantially as shown and described.

6. A traveling car carrying an electric circuit and having short circuit or shunt connections one portion of which is made movable and yielding to the force of the air pressure when the car is in motion, to open the shunt substantially as and for the purpose described.

7. A traveling car carrying an electric circuit and having a short circuit or shunt device composed of the terminal plates $e$ and $g$, $e$ being made yielding and resilient, and yielding bridge plates $f\ f$ connecting plates $e$ and $g$ substantially as and for the purpose described.

8. The combination with the car and its electric circuit of the hinged and yielding plate $e$, stationary plate $g$, hinged arms $h\ h$ with insulated metal plates $f\ f$ arranged upon opposite sides of the plates $e$ and $g$, stationary posts $k\ k$, and a spring and adjusting screw for regulating the pressure at which plate $e$ may yield substantially as and for the purpose described.

9. The combination of the double pole reversing switch E, having lever $l$ with projection $m$ arranged upon the lower portion of the locomotive, an electric circuit controlled thereby, and fixed and inclined faced adjusting blocks $n$ placed in the road bed at the ends of the route to act upon the projections $m$ of the switch to automatically reverse the same substantially as shown and described.

10. The reversing mechanism of the locomotive engine comprising lever $p$ and rod $q$, the latter being constructed with an elongated slot $r$, combined with a reversing switch for the electric circuits having a connection playing loosely in the said slot substantially as and for the purpose described.

11. The combination with a railway car; of a pendent frame 1, 1, with fixed cross bar 2 and vertically sliding cross bar 3, uprights 4, 4, fixed to cross bar 3 and sliding through cross bar 2, and the trolley wheel having an axle 5 turning and playing longitudinally in bearings in the uprights substantially as and for the purpose described.

RENE RAVENEL SNOWDEN.
ALBERT CRONIN IVES.

Witnesses:
GEO. N. HALLETT,
C. M. LIVINGSTON.